United States Patent
Mueller et al.

(10) Patent No.: US 11,686,607 B2
(45) Date of Patent: Jun. 27, 2023

(54) RADIOMETRIC MEASUREMENT DEVICE

(71) Applicant: Berthold Technologies GmbH & Co. KG, Bad Wildbad (DE)

(72) Inventors: Steffen Mueller, Pforzheim (DE); Joerg Baeuerle, Baiersbronn (DE)

(73) Assignee: Berthold Technologies GmbH & Co. KG, Bad Wildbad (DE)

( * ) Notice: Subject to any disclaimer, the term of this patent is extended or adjusted under 35 U.S.C. 154(b) by 424 days.

(21) Appl. No.: 16/750,553

(22) Filed: Jan. 23, 2020

(65) Prior Publication Data
US 2020/0249069 A1 Aug. 6, 2020

(30) Foreign Application Priority Data

Jan. 31, 2019 (DE) ...................... 10 2019 201 278.7

(51) Int. Cl.
*G01F 23/288* (2006.01)
*G01N 9/24* (2006.01)

(52) U.S. Cl.
CPC ............ *G01F 23/288* (2013.01); *G01N 9/24* (2013.01)

(58) Field of Classification Search
None
See application file for complete search history.

(56) References Cited

U.S. PATENT DOCUMENTS

2003/0227382 A1* 12/2003 Breed .................. G08B 13/248
340/568.1
2018/0137691 A1   5/2018 Satou

FOREIGN PATENT DOCUMENTS

DE   10 2017 219 843 A1   5/2018

OTHER PUBLICATIONS

Zilouchian, Ali. "Fundamentals of neural networks." Intelligent control systems using soft computing methodologies 1 (2001): 1-5. (retrieved from https://umh1480.edu.umh.es/wp-content/uploads/sites/44/2013/02/Fundamentals_of_Neural_Networks.pdf on Mar. 15, 2022).*

* cited by examiner

*Primary Examiner* — Edwin C Gunberg
(74) *Attorney, Agent, or Firm* — Crowell & Moring LLP

(57) ABSTRACT

A radiometric measurement device includes a number n of sensors, wherein a respective sensor of the number n of sensors is configured to generate associated sensor data, such that overall a number n of sensor data is generated by means of the number n of sensors. A measurement variable calculation unit is configured to calculate a number m of measurement variable values depending on the number n of sensor data on the basis of values of a number d of parameters. A learning unit is configured to calculate the values of the number d of parameters on the basis of training data.

4 Claims, 2 Drawing Sheets

RADIOMETRIC MEASUREMENT DEVICE

CROSS REFERENCE TO RELATED APPLICATION

This application claims priority under 35 U.S.C. § 119 from German Patent Application No. 10 2019 201 278.7, filed Jan. 31, 2019, the entire disclosure of which is herein expressly incorporated by reference.

BACKGROUND AND SUMMARY OF THE INVENTION

The invention relates to a radiometric measurement device.

In process metrology, for measuring process variables or material properties, for example for filling level measurement, for density measurement, etc., use is often made of radiometric measurement devices comprising radiometric sensors for radiation measurement.

The invention is based on the object of providing such a radiometric measurement device which, even in the case of complex radiometric measurement problems, enables reliable determination of values of a number of variables to be measured.

The invention achieves this and other objects by means of a radiometric measurement device according to the claimed invention.

The radiometric measurement device comprises a number n of sensors, wherein n is a natural number greater than zero. The number n can, for example, be in a range of between one and 12.

A respective sensor of the number n of sensors is configured to generate its associated sensor data, with the result that overall a number n of sensor data is generated by means of the number n of sensors. The sensor data are for example in each case data in a digital representation, for example having a resolution of between 8 bits and 64 bits. The digital sensor data are generated for example continuously with a predefined temporal repetition rate. By way of example, every 100 ms the data of all n sensors are generated simultaneously or with a known temporal relationship to one another.

The radiometric measurement device furthermore comprises at least one measurement variable calculation unit configured to calculate a number m of measurement variable values or process measurement values depending on the number n of sensor data on the basis of values of a number d of parameters. In particular, the number d of parameters are parameters of a hypothesis function h which approximates a measurement function f. The sensor data can also be offset in time. The number m is a natural number greater than zero and can be for example in a range of between one and 4. The number d is a natural number greater than zero and can be for example in a range of between one and 500. The measurement variable values represent for example a corresponding number of process variables to be measured.

The radiometric measurement device furthermore comprises a learning unit, wherein the learning unit is configured to calculate the values of the number d of parameters on the basis of training data.

The learning unit, the number of sensors and the measurement variable calculation unit can be provided spatially together or spatially separately from one another. By way of example, the number of sensors and the measurement variable calculation unit can be arranged at the location of the measurement task, i.e. in the field, and the learning unit can be arranged spatially separately therefrom. The learning unit can be realized by means of a powerful computer, for example, which calculates the number d of parameters on the basis of the training data, wherein the number d of parameters are subsequently made available to the measurement variable calculation unit, for example by the number d of parameters being transmitted via a data network from the learning unit to the measurement variable calculation unit. It goes without saying that the learning unit and the measurement variable calculation unit, and optionally also the number n of sensors, can be integrated into one common physical device.

In accordance with one embodiment, the measurement variable calculation unit comprises at least one feature extraction unit configured to extract feature data from the number n of sensor data, in particular on the basis of the values of the number d of parameters, wherein the at least one measurement variable calculation unit is configured to calculate the number m of measurement variable values from the feature data on the basis of the values of the number d of parameters.

In accordance with one embodiment, the number n of sensors is selected from the set of sensors consisting of: at least one radiometric sensor, in particular a radiometric sensor configured to generate sensor data in the form of a counting rate or radiation intensity data, and/or a radiometric sensor configured to generate sensor data in the form of information about radiometric spectra, at least one sensor configured to generate sensor data in the form of temperature data, at least one sensor configured to generate sensor data in the form of acceleration data, at least one sensor configured to generate sensor data in the form of velocity data, at least one sensor configured to generate sensor data in the form of position data, at least one sensor, in particular in the form of an ultrasonic sensor or laser sensor, configured to generate sensor data in the form of information about a loading height profile, and at least one sensor configured to generate sensor data in the form of moisture data.

In accordance with one embodiment, the learning unit is configured to extract training sensor data and to extract setpoint values—associated with the training sensor data—of the number m of measurement variable values from the training data, wherein the measurement variable calculation unit is configured to calculate training values of the number m of measurement variable values depending on the training sensor data, and wherein the learning unit is configured to calculate the values of the number d of parameters on the basis of the setpoint values of the number m of measurement variable values and the training values of the number m of measurement variable values.

In accordance with one embodiment, the at least one measurement variable is selected from the set of measurement variables consisting of: filling level, positions and/or thicknesses of individual material layers, density, conveyed quantity, in particular total conveyed mass, throughput, in particular mass flow rate, and material composition, in particular content parameters.

In the case of complex radiometric measurement problems, the relationships between sensor data and measurement variable values are not always exactly describable analytically. Therefore, heretofore this relationship has had to be approximated by suitable physical and mathematical models. Often, however, the measurement model is unknown or approximated too simply, a suitable model for sensor fusion is not known and/or the measurement model is too complicated. Overall, the quality of the measurement variable values or process values calculated in the measurement system is therefore detrimentally affected.

According to the invention, this problem is solved by virtue of the fact that the radiometric measurement device produces relationships between sensor data and measurement variable values using methods of artificial intelligence, such as, for example, "Machine Learning" or "Deep Learning", in an automated and self-learning manner and without explicit knowledge of an analytical measurement equation on the basis of training data.

This increases the measurement accuracy by reducing systematic errors. The quality and accuracy of the calculated measurement variable values are increased since the radiometric measurement device learns the totality of all process influences with the aid of the training data. This includes not only the known influences but also, in particular, unknown disturbance influences, the existence of which is not known upon start-up, for example. Therefore, the radiometric measurement device can even contain more expert knowledge than a human operator and process experts in the field. This results in a significant improvement in the measurement variable value accuracy.

Furthermore, hitherto insoluble measurement tasks are soluble. In contrast to traditional measurement systems in radiometric process metrology, according to the invention there is no need for an explicit measurement model to be known in advance. Rather, the radiometric measurement device itself creates the measurement model by means of artificial intelligence. The physical process to be measured can thus be treated as a black box, the internal logic of which is unknown and is learnt and organized by the radiometric measurement device itself. As a result, the invention also makes it possible to represent measurement tasks for novel, previously strange or insoluble physical processes. This affords a considerable advantage since it is possible to open up new markets and problem fields without expert knowledge or with only rudimentary specialist knowledge in the respective domain. The radiometric measurement device according to the invention acquires the expert knowledge itself.

Furthermore, the radiometric measurement device according to the invention needs a smaller storage requirement compared with conventional solutions of similar performance. If the amount of information that is processed and learnt during the learning phase according to the invention is compared with the number of model parameters, the storage requirement of the radiometric measurement device according to the invention is comparatively small. If there were a desire to achieve similar measurement accomplishments using conventional measurement devices (insofar as this is possible at all), extensive calibration tables would be needed which would exceed any storage limitations of embedded systems.

Furthermore, the radiometric measurement device according to the invention enables shorter cycle times and higher update rates. The computation steps carried out in the radiometric measurement device according to the invention for processing the sensor data into the measurement variable values during the measurement process are based for the most part on methods of linear algebra, specifically from matrix vector multiplications. These operations are carried out on corresponding hardware in a manner significantly more performant than traditional procedural mathematical algorithms in radiometric process metrology. This results in shorter cycle times of the measurement system and thus, for the customer, in higher update rates in the process control system.

Furthermore, the radiometric measurement device according to the invention enables shorter design times. Since only little expert knowledge from the respective specialist domain is needed according to the invention, individual customer solutions for novel measurement tasks can be developed more rapidly. The associated measurement systems can be designed and individualized significantly more simply. This saves time and reduces costs.

Furthermore, the radiometric measurement device according to the invention enables simpler operational control. A calibration of the radiometric measurement device according to the invention is very simple. Instead of determining complex, measurement-application-specific calibration parameters as in traditional measurement devices, according to the invention it is merely necessary for training data to be recorded. The radiometric measurement device then calibrates itself by means of the learning unit. For the operator, the calibration process is thus standardized across measurement applications and simplified to a significant extent.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
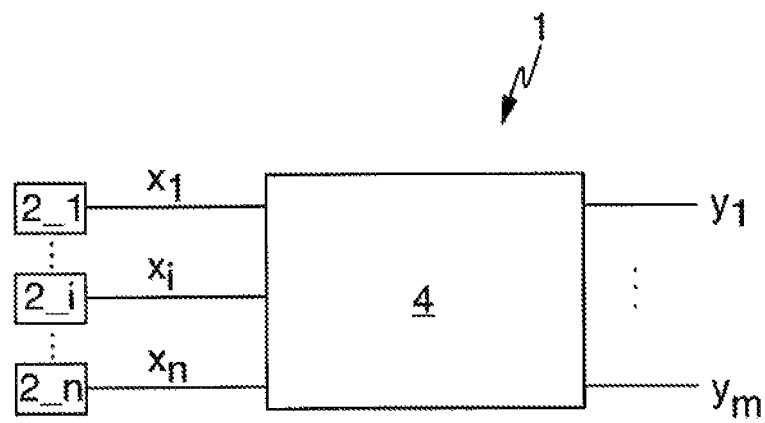
FIG. 1 is a highly schematic block diagram of a radiometric measurement device according to an embodiment of the invention.

FIG. 1 shows highly schematically a block diagram of a radiometric measurement device 1.

The radiometric measurement device 1 comprises a number n of sensors 2_1 to 2_n, wherein a respective sensor 2_i of the number n of sensors 2_1 to 2_n is configured to generate associated sensor data xi. The result is that overall a number n of sensor data $x_1, \ldots, x_n$ is generated by means of the number n of sensors 2_1 to 2_n.

The radiometric measurement device 1 furthermore comprises a measurement variable calculation unit 4 configured to calculate a number m of measurement variable values $y_1, \ldots, y_m$ depending on the number n of sensor data $x_1, \ldots, x_n$ on the basis of values of a number d of parameters $\theta_1, \ldots, \theta_d$.

Figure 4:
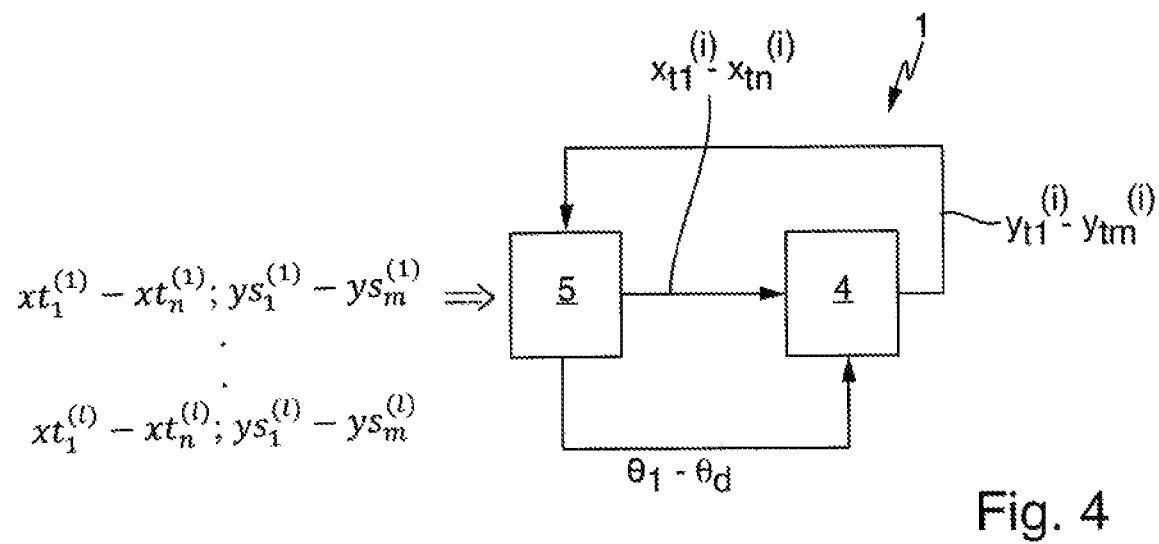
FIG. 4 is a highly schematic block diagram of the radiometric measurement device shown in FIG. 1 in a learning mode of operation.

Referring to FIG. 4, the radiometric measurement device 1 comprises a learning unit 5, wherein the learning unit 5 is configured to calculate the values of the number d of parameters $\theta_1, \ldots, \theta_d$ on the basis of training data $xt_1^{(i)}, \ldots, xt_n^{(i)}; ys_1^{(i)}, \ldots, ys_m^{(i)}$.

The radiometric measurement device 1 converts input variables in the form of the sensor values $x_1, \ldots, x_n$, which can also be time-offset, into output variables in the form of the process measurement variables or measurement variable values $y_1, \ldots, y_m$.

The conversion depends on the model parameters $\theta_1, \ldots, \theta_d$, which are initially unknown and are learnt by way of the learning unit 5 via so-called machine learning. Recorded training data, also called learning data, are used here, which can be formed from real recorded data during operation and/or from simulation data.

Machine learning means that the radiometric measurement device artificially generates knowledge from experience. The radiometric measurement device learns from examples and can generalize them after the end of the learning phase. That means that the examples are not simply learned by heart, rather the radiometric measurement device recognizes patterns and regularities in the training data. It can thus also assess unknown data (learning transfer).

The radiometric measurement device preferably uses learning techniques from so-called supervised learning, wherein the radiometric measurement device learns a measurement function from given pairs of inputs and outputs. In this case, the correct measurement variable values with respect to a number n of sensor data are provided during learning for example on the basis of a reference measurement or a simulation.

The radiometric measurement device thus formally approximates a measurement function $f:(x_1, \ldots, x_n) \mapsto (y_1, \ldots, y_m)$, which maps n input variables or sensor data $(x_1, \ldots, x_n)$ onto m output variables or measurement variable values $(y_1, \ldots, y_m)$, by a suitable hypothesis function $h_\theta$: $(x_1, \ldots, x_n) \mapsto (\hat{y}_1, \ldots, \hat{y}_m)$, which maps the n sensor data $(x_1, \ldots, x_n)$ onto m estimated values $(\hat{y}_1, \ldots, \hat{y}_m)$ for the $(y_1, \ldots, y_m)$ and is dependent on the model parameters $\theta:=(\theta_1, \ldots, \theta_d)$.

In this case, each of the d individual model parameters $\theta_i$ is understood to be one of the following three things:

(1) a mathematical object, in particular
 a number,
 a vector,
 a function;

(2) a parameterized piece of program logic or source code;

(3) a piece of program logic or source code generated by a code generator.

The model parameters $(\theta_1, \ldots, \theta_d)$ are learned from training data by the learning algorithm. More precisely, training data consist of l (wherein l is for example in a range of between $10^5$ and $10^7$, in particular $l=10^6$) training pairs $(xt^{(1)}, ys^{(1)}), \ldots, (xt^{(l)}, ys^{(l)})$, which e.g. each have the dimension n+m and for example each consist of a complete set of input data or training sensor data $xt^{(i)}:=(xt_1^{(i)}, \ldots, xt_n^{(i)})$ plus associated setpoint values $ys^{(i)}:=(ys_1^{(i)}, \ldots, ys_m^{(i)})$ of the number m of measurement variable values, wherein $i=1, \ldots, l$. The setpoint values $(ys_1^{(i)}, \ldots, ys_m^{(i)})$ are also referred to as training labels.

On the basis of the training sensor data $(xt_1^{(i)}, \ldots, xt_n^{(i)})$, the measurement variable calculation unit 4 calculates the training values $(yt_1^{(i)}, \ldots, yt_m^{(i)}):=h_\theta(xt_1^{(i)}, \ldots, xt_n^{(i)})$ of the number m of measurement variable values $(y_1, \ldots, y_m)$, said training values being dependent on the parameters $(\theta_1, \ldots, \theta_d)$. The learning unit 5 is configured to calculate the values of the parameters $(\theta_1, \ldots, \theta_d)$ for $i=1, \ldots, l$ on the basis of setpoint values $(ys_1^{(i)}, \ldots, ys_m^{(i)})$ and the training values $(yt_1^{(i)}, \ldots, yt_m^{(i)})$.

The calculation of the model parameters $(\theta_1, \ldots, \theta_d)$ can be carried out repeatedly iteratively. That is to say that random starting parameters $(\theta_1, \ldots, \theta_d)$ are used as a beginning. These are then improved iteratively by calculating repeatedly all $(yt_1^{(i)}, \ldots, yt_m^{(i)})$ on the basis of the respectively current $(\theta_1, \ldots, \theta_d)$ and then new, improved $(\theta_1, \ldots, \theta_d)$ therefrom, until a predefinable quality measure is attained (for example minimum of a cost function). Moreover, in each iteration step, it is possible to use only a subset of the total of l data sets $(yt_1^{(i)}, \ldots, yt_m^{(i)})$, a so-called mini-batch, in order to calculate new $(\theta_1, \ldots, \theta_d)$. That is to say that a plurality of iterations may be required in order to take account of the entire training data once, a so-called training epoch.

The learning algorithm is carried out for example once upon the start-up of the radiometric measurement device or repeatedly in real time during the operation of the radiometric measurement device, e.g. by means of additional reference measurements.

Figure 2:
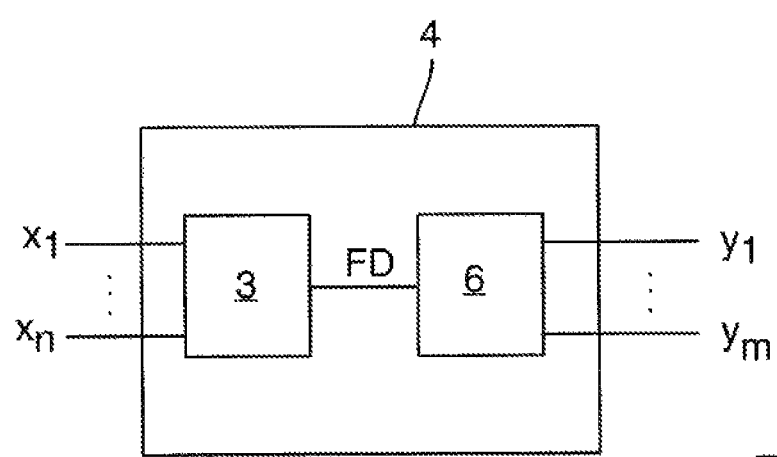
FIG. 2 is a highly schematic block diagram of an internal structure of one embodiment of a measurement variable calculation unit of the radiometric measurement device shown in FIG. 1.

FIG. 2 shows highly schematically a block diagram of an internal structure of one embodiment of a measurement variable calculation unit 4 of the radiometric measurement device 1 shown in FIG. 1.

The measurement variable calculation unit 4 comprises an optional feature extraction unit 3 configured to extract feature data FD from the number n of sensor data $x1, \ldots, xn$, in particular on the basis of the values of the number d of parameters $\theta_1, \ldots, \theta_d$.

The measurement variable calculation unit 4 furthermore comprises an artificial intelligence (AI) unit 6 configured to calculate the number m of measurement variable calculation unit values $y1, \ldots, ym$ from the feature data FD on the basis of the values of the number d of parameters $\theta_1, \ldots, \theta_d$.

From the "raw" sensor data or measurement data $x_1, \ldots, x_n$, firstly suitable features FD are extracted and transformed in order to generate as meaningful input data as possible for the AI unit 6. In particular, one or more of the following techniques are used for this purpose: principal component analysis (PCA), discriminant analysis, statistical normalization, polynomial transformation, exponential transformation, logarithmic transformation.

It goes without saying that the feature extraction can also be dispensed with, such that the AI unit 6 uses the non-preprocessed, raw sensor data $x_1, \ldots, x_n$.

The AI unit 6 calculates a continuous output signal (regression method) or a discrete output signal (classification method), depending on the measurement application. It is realized by an AI model from one of the following four categories:

Models which, by way of metrics or suitable similarity functions, in a single stage or a plurality of stages, compare the input values with the stored training data and then allocate to them the output values of those training data which are "nearby" or similar in a certain way.

This can be for example one of the following two AI models:

(1) k-nearest-neighbor classification,
(2) k-nearest-neighbor regression;
metrics or similarity functions used can be, in particular:
p-norm,
Minkowski distance,
Kullback-Leibler divergence.

Models which calculate threshold values from the training data, against which threshold values the given input values are then compared in a plurality of stages, usually recursively, in order to determine the associated output values.

This can be for example one of the following two AI models:
(1) decision tree classification,
(2) decision tree regression.

Models which estimate transition probabilities from the training data and combine said transition probabilities with one another (possibly in a plurality of stages) additively and multiplicatively using the Bayes theorem in order to estimate for given input values a univariate or multivariate probability distribution on the output values. The output values having the highest probabilities are then allocated to the input values.

This can be for example one of the following two AI models:
(1) Bayes classifier, in particular naive Bayes classifier,
(2) Bayesian network classifier.

Models which, with the aid of methods of linear algebra, in a single stage or a plurality of stages, apply so-called activation functions to linear combinations and/or convolutions of the transformed or untransformed input values in order then to calculate the output values therefrom.

This can be for example one of the following two AI models:
(1) multiclass support vector machine (SVM) with one-vs-one or one-vs-all,
  kernel functions used can be, in particular:
    polynomial kernel,
    Gaussian RBF kernel,
    Laplace RBF kernel,
    sigmoid kernel,
    hyperbolic tangent kernel,
    Bessel kernel,
    Anova kernel,
    linear splines kernel;
(2) artificial neural network (ANN) and/or deep neural network (DNN),
  activation functions used can be, in particular:
    identity,
    sigmoid,
    hyperbolic tangent,
    ReLu,
    softmax,
    Signum.

Figure 3:
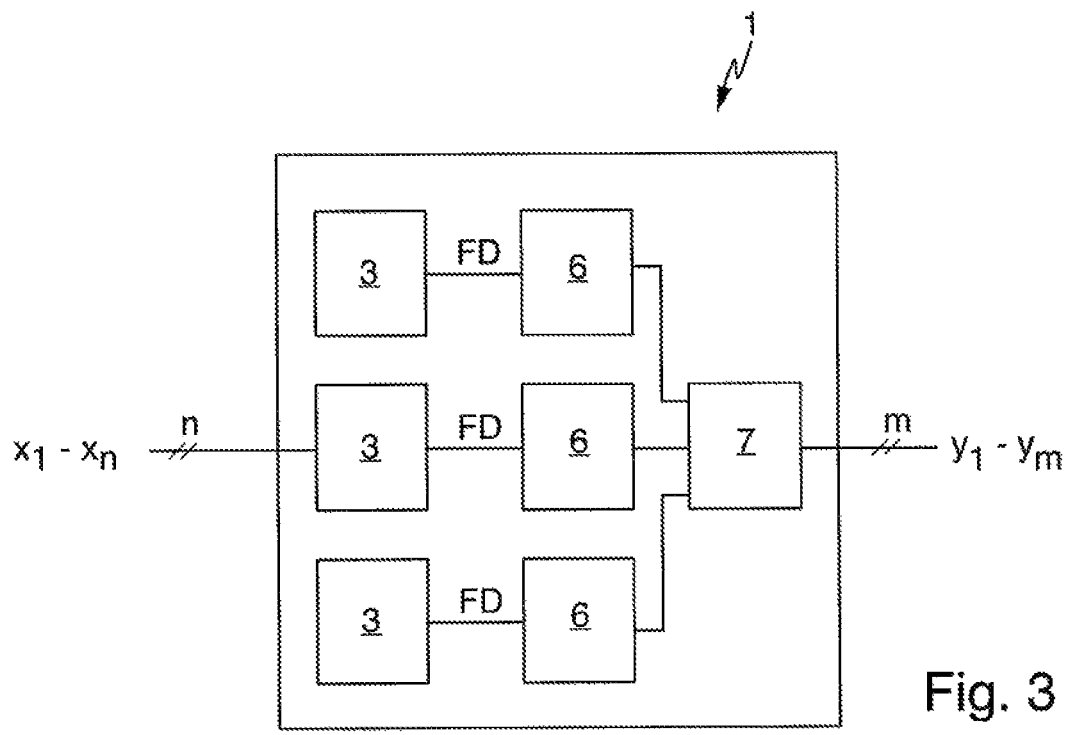
FIG. 3 is a highly schematic block diagram of an internal structure of a further embodiment of a measurement variable calculation unit of the radiometric measurement device shown in FIG. 1.

Referring to FIG. 3, which illustrates highly schematically a block diagram of an internal structure of a further embodiment of a measurement variable calculation unit 4 of the radiometric measurement device 1 shown in FIG. 1, optionally a number from a plurality of individual AI units 6 of categories above can also be combined to form a more powerful overall model with the aid of ensemble learning. In FIG. 3, three feature extraction units 3 and three AI units 6 respectively connected downstream operate in parallel, wherein a so-called ensemble combiner 7 combines the respective data. By way of example, it is possible to use so-called bagging or so-called boosting as an ensemble learning technique.

The model parameters ($\theta_1, \ldots, \theta_d$) of the AI unit(s) 6 are determined from the training data by means of machine learning for example using one of the following techniques:
(a) by one-off or repeated minimization of metrics or maximization of similarity functions. This can be in particular one or more of the following:
  Entropy,
  Gini impurity,
  variance,
  p-norm,
  Minkowski distance,
  Kullback-Leibler divergence;
(b) by means of one-off or repeated minimization of a cost function which is dependent on the AI model chosen and the function arguments of which consist of the training data and the model parameters. The minimization may be subject to certain mathematical constraints (restriction of the search area), which may likewise be dependent on the training data and/or model parameters. The cost function is minimized with regard to the model parameters, using mathematical optimization methods and techniques, in particular one or more of the following:
  backpropagation,
  gradient descent based method,
  stochastic gradient descent based method (for example AdaGrad, RMSProp or Adam),
  Gauss-Newton method,
  quasi-Newton method,
  linear programming,
  quadratic programming.

The minimization of a cost function can include the maximization of a merit function, in particular of a maximum likelihood function or of a maximum a posteriori probability function, in particular by changing the mathematical sign.

In order to prevent overfitting, to improve the capability of learning transfer and thus to increase the performance of the AI unit(s) 6, in the learning method it is possible to use additional regularization techniques, such as, for example:
  p-norm penalty terms (L1, L2, etc.),
  dropout,
  batch normalization.

Unless defined otherwise, all AI technical terms should be understood in accordance with the academic standard literature for AI and machine learning. See also, in particular:
1. Bishop, Christopher M.: "Pattern Recognition and Machine Learning"
2. Mitchell, Tom M.: "Machine Learning"
3. Russell, Stuart J. and Norvig, Peter: "Artificial Intelligence: A Modern Approach"
4. Richard O. Duda and Hart, Peter E. and David G. Stork: "Pattern Classification"
5. Aggarwal, Charu C.: "Neural Networks and Deep Learning: A Textbook".

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An apparatus, comprising:
   a process metrology radiometric measurement device, the radiometric measurement device comprising:
     a number n of sensors, wherein a respective sensor of the number n of sensors is configured to generate associated sensor data, such that overall a number n of sensor data is generated by way of the number n of sensors;
     a measurement variable calculation unit configured to calculate a number m of process measurement variable values depending on the number n of sensor data on the basis of values of a number d of parameters; and
     a learning unit, wherein the learning unit is configured to calculate the values of the number d of parameters on the basis of training data, wherein the radiometric measurement device self-calibrates via the learning unit, and at least one process measurement variable is selected from a set of process measurement variables comprising:
filling level of a material,
positions and/or thicknesses of individual material layers of a material,
material density,
conveyed mass of a material,
mass flow rate of a material throughput.

2. The radiometric measurement device according to claim 1, wherein
the measurement variable calculation unit comprises at least one feature extraction unit configured to extract feature data from the number n of sensor data, on the basis of the values of the number d of parameters, and
the at least one measurement variable calculation unit is configured to calculate the number m of measurement variable values from the feature data on the basis of the values of the number d of parameters.

3. The radiometric measurement device according to claim 1, wherein
the number n of sensors is selected from a set of sensors comprising:
at least one radiometric sensor configured to generate sensor data in the form of a counting rate or radiation intensity data, and/or a radiometric sensor configured to generate sensor data in the form of information about radiometric spectra,
at least one sensor configured to generate sensor data in the form of temperature data,
at least one sensor configured to generate sensor data in the form of acceleration data,
at least one sensor configured to generate sensor data in the form of velocity data,
at least one sensor configured to generate sensor data in the form of position data,
at least one sensor in the form of an ultrasonic sensor or laser sensor, configured to generate sensor data in the form of information about a loading height profile, and
at least one sensor configured to generate sensor data in the form of moisture data.

4. The radiometric measurement device according to claim 1, wherein
the learning unit is configured to extract a number n of training sensor data and a number m of associated setpoint values of the number m of measurement variable values from the training data,
the measurement variable calculation unit is configured to calculate a number m of training values of the number m of measurement variable values depending on the number n of training sensor data, and
the learning unit is configured to calculate the values of the number d of parameters on the basis of the number m of setpoint values of the number m of measurement variable values and the number m of training values of the number m of measurement variable values.

* * * * *